United States Patent
Nuhn (10) Patent No.: US 12,123,525 B2
(45) Date of Patent: Oct. 22, 2024

(54) CURVED TELESCOPING LIQUID MEDIUM DELIVERY DEVICE

(71) Applicant: Nuhn Industries Ltd., Sebringville (CA)

(72) Inventor: Ian Nuhn, Stratford (CA)

(73) Assignee: Nuhn Industries Ltd., Sebringville (CA)

( * ) Notice: Subject to any disclaimer, the term of this patent is extended or adjusted under 35 U.S.C. 154(b) by 0 days.

(21) Appl. No.: 17/691,336

(22) Filed: Mar. 10, 2022

(65) Prior Publication Data

US 2022/0290786 A1    Sep. 15, 2022

Related U.S. Application Data

(60) Provisional application No. 63/159,040, filed on Mar. 10, 2021.

(51) Int. Cl.
*F16L 27/12* (2006.01)
*F16L 43/00* (2006.01)

(52) U.S. Cl.
CPC ............. *F16L 27/125* (2013.01); *F16L 43/00* (2013.01)

(58) Field of Classification Search
CPC ...... F16L 27/125; F16L 43/00; B05B 15/652; B05B 15/656; B05B 15/72; A01C 3/026
See application file for complete search history.

(56) References Cited

U.S. PATENT DOCUMENTS

| | | | | |
|---|---|---|---|---|
| 1,911,311 A | * | 5/1933 | Clemens | F16L 43/006 |
| | | | | 285/302 |
| 4,101,251 A | | 7/1978 | Gay et al. | |
| 4,652,017 A | * | 3/1987 | Drechsel | F16L 27/0849 |
| | | | | 285/184 |
| 5,324,001 A | * | 6/1994 | Duke | B60R 15/00 |
| | | | | 285/236 |

(Continued)

FOREIGN PATENT DOCUMENTS

| | | | | |
|---|---|---|---|---|
| CA | 2947205 A1 | * | 5/2017 | ........... A01C 23/047 |
| CN | 203297714 U | | 11/2013 | |
| EP | 185901 B1 | | 6/1990 | |

(Continued)

OTHER PUBLICATIONS

Matthews, Charli K. "Pneumatic Pump Basics", https://empoweringpumps.com/pneumatic-pump-basics, Sep. 27, 2015, Empowering Pumps and Equipment, 5 pages. (Year: 2015).*

*Primary Examiner* — James M Hewitt, II
(74) *Attorney, Agent, or Firm* — Brunet & Co. Ltd.; Robert Brunet; Hans Koenig (57) ABSTRACT

A liquid medium delivery device has: first and second rigid pipes configured to receive flowing liquid medium from a pump. The first rigid pipe has a first curved portion. The second rigid pipe has a second curved portion. The curved portions are at least partially nested. An actuator is connected to the first rigid pipe or the second rigid pipe or both the first and second rigid pipes. The actuator is operable to move either the first rigid pipe or the second rigid pipe so that either the first curved portion or the second curved portion moves along a common arc of both the first curved portion and the second curved portion. The liquid medium delivery device has an outlet through which liquid medium, for example liquid manure, can be pumped.

14 Claims, 12 Drawing Sheets

(56) References Cited

U.S. PATENT DOCUMENTS 8,939,637 B2 * 1/2015 Depault ................. A01C 3/026
 417/900
2012/0224982 A1 * 9/2012 Nuhn .................... F04D 29/466
 417/430

FOREIGN PATENT DOCUMENTS

| GB | 191314792 A | 1/1914 | | |
|----|----|----|----|----|
| GB | 1116612 A | 6/1968 | | |
| WO | WO-2006056849 A2 * | 6/2006 | ............. | B65G 53/24 |
| WO | WO-2009091328 A1 * | 7/2009 | ............. | B08B 15/00 |
| WO | WO-2015024116 A1 * | 2/2015 | ........... | A01C 23/045 |

* cited by examiner

CURVED TELESCOPING LIQUID MEDIUM DELIVERY DEVICE

CROSS-REFERENCE TO RELATED APPLICATIONS

This application claims the benefit of U.S. patent application 63/159,040, filed Mar. 10, 2021, which is incorporated herein by reference.

FIELD

This application relates to liquid medium delivery devices, especially for use with pumps.

BACKGROUND

Liquid manure pumps are used in the agricultural industry to pump liquid manure from a lagoon into holding tanks of liquid manure spreaders. In addition, liquid manure pumps are used to agitate and mix liquid manure in the lagoon to help prevent solids suspended in the liquid from settling out. Agitation and mixing performed by the liquid manure pump are accomplished with an agitator nozzle in liquid communication with the pump. In a liquid manure pump, at least a portion of the liquid manure being pumped can be diverted to the agitator nozzle from a main pipe, the agitator nozzle directing liquid manure flow back into the lagoon as a pressurized liquid manure stream in order to agitate and mix the liquid manure in the lagoon.

Further, vertically-oriented liquid pumps often must fit into very tight pump out holes; therefore, the size and compactness of the agitator nozzle is very important. Conventional agitator nozzle designs are large and cumbersome. In some prior art designs, a ball-and-socket joint is used which only provides a total of 45° in vertical movement, and the nozzle is big. In other prior art designs, a flex hose is used but the agitator nozzle must be removed and remounted once the pump is in the out hole.

There remains a need for a liquid medium delivery device that is less bulky and/or is aimable in more directions so that the pump on which the device is mounted can fit into smaller out holes and the device is able to deliver liquid medium to more places without moving the pump on which the liquid medium delivery device is mounted.

SUMMARY

A liquid medium delivery device useable in conjunction with a pump is provided, the device comprising: a first rigid pipe and a second rigid pipe configured to receive flowing liquid medium from the pump; the first rigid pipe having a first curved portion; the second rigid pipe having a second curved portion whereby the second curved portion is at least partially disposed within the first curved portion of the first rigid pipe or the first curved portion is at least partially disposed within the second curved portion of the second rigid pipe; and, an actuator connected to the first rigid pipe or the second rigid pipe or both the first and second rigid pipes, the actuator operable to move either the first rigid pipe or the second rigid pipe so that either the first curved portion or the second curved portion moves along a common arc of both the first curved portion and the second curved portion.

A liquid medium delivery system comprises: a pump; and, a liquid medium delivery device as described above, the first and second rigid pipes in liquid communication with the pump.

A liquid medium delivery device is provided, especially for use in conjunction with a pump to deliver liquid medium from one location to another. The device may comprise two rigid pipes, including an inner pipe and an outer pipe, each of the pipes being at least partially curved so as to have a curved portion. The inner pipe has an outer diameter that is smaller than an inner diameter of the outer pipe so that the inner pipe is able to translate inside the outer pipe, or the outer pipe is able to translate outside the inner pipe.

At least one of the pipes is connected to an actuator (e.g., a hydraulic cylinder, linear actuator or the like), the actuator causing one of the pipes to translate so that the curved portion of the translating pipe moves arcuately along a common arc common to the curved portions of both of the pipes. Thus, the common arc defines a centerline arc of both the first curved portion and the second curved portion, such that the first and second pipes are concentric with one another about the common arc. The arcuate movement of the curved portion of the translating pipe within or around the curved portion of the other pipe results in telescopic movement of the pipes relative to each other. The translating pipe may be the inner pipe or the outer pipe. In some embodiments, the actuator is pivotally connected to both the first rigid pipe and the second rigid pipe.

The curved portion of the translating pipe pivots around a pivot point external to the two pipes located at a center point of a circle defined by the common arc of the pipes. Thus, the first rigid pipe or the second rigid pipe pivots about a pivot point external to both the first rigid pipe and the second rigid pipe so that the first rigid pipe or the second rigid pipe moves along the common arc. A distance from the pivot point to the centerline arc is a radius of both the first curved portion and the second curved portion. In some embodiments, the actuator is pivotally connected to the first rigid pipe or the second rigid pipe at a connection point spatially offset from the pivot point. In some embodiments, the actuator is pivotally connected to the first rigid pipe at a first location on the first rigid pipe; the actuator is pivotally connected to the second rigid pipe at a second location on the second rigid pipe; and, the first and second locations are in opposite sides of the pivot point from each other. In some embodiments, a first mounting bracket is attached to the first rigid pipe; a second mounting bracket is attached to the second rigid pipe; and, a third mounting bracket is attached to either the first or second rigid pipe and located between the first and second mounting brackets. The actuator may be pivotally connected to the both first and second mounting brackets; and, the third mounting bracket may be pivotally connected to either the first or second mounting bracket at the pivot point.

The device comprises an inlet at a proximal end of the device for receiving liquid medium from a liquid medium line so that the pipes are in liquid communication with a pump. The device also comprises an outlet at a distal end of the device out of which the liquid medium is ejected from the device. The outlet may be located on the translating pipe. The outlet may have a smaller diameter than the inlet to form a nozzle for increasing the distance that the liquid medium is ejected from the device.

Because the curved portion of the translating pipe pivots around a pivot point, the orientation of the outlet changes as the translating pipe moves thereby reorienting a direction in which the liquid medium is ejected from the device. Therefore, liquid medium flowing out of the device can be aimed toward a desired location in the environment. Thus, the liquid medium delivery device is aimable in more directions to be able to deliver liquid medium to more places without moving a pump on which the liquid medium delivery device is mounted.

The device may be mounted on a rotary coupler that is concentric with the liquid medium line and in fluid communication therewith, such that rotation of the rotary coupler causes the device to rotate about the liquid medium line. In this embodiment, the actuator is connected to both the first and second pipes and rotates with the device when the rotary coupler is rotated. This increases the variety of directions in which the device can be oriented without moving the pump.

The device may further comprise a seal (e.g., an O-ring, a lip seal or the like) disposed between, for example, an outer surface of the inner pipe and an inner surface of the outer pipe. Thus, the seal may be between the first and second curved portions of the first and second rigid pipes, respectively.

The seal prevents liquid medium from flowing through a gap between the inner pipe and the outer pipe so that all, or at least most, of the liquid medium passing through the device does not pass out through the gap between the inner pipe and the outer pipe. In some embodiments, the seal is mounted on the second curved portion of the second rigid pipe where the second curved portion is at least partially disposed within the first curved portion of the first rigid pipe. In some embodiments, the seal is mounted on the first curved portion of the first rigid pipe where the first curved portion is at least partially disposed within the second curved portion of the second rigid pipe. The seal preferably comprises a resilient material (e.g., an elastomer) that is able to provide a continuing seal despite the relative movement of the inner and outer pipes. Furthermore, the seal is preferably made of a material that can sufficiently withstand back-pressure of liquid medium in the pipes and/or abrasion from debris in the liquid medium flow to provide a suitably long service life before requiring replacement.

The liquid medium may be a liquid or a liquid having gas and/or solids suspended therein. The device is especially useful for liquids (e.g., water, firefighting solutions, cleaning solutions or the like) and liquids having solids suspended therein (e.g., liquid manure). While the device is particularly useful with liquid manure pumps, particularly as an agitator for liquid manure in association with the liquid manure pump, the device may find application in other fields, for example in firefighting, cleaning operations and the like.

The liquid medium delivery device is less bulky and is aimable in more directions so that the pump on which the device is mounted can fit into smaller out holes and the device is able to deliver liquid medium to more places without moving the pump.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

A first embodiment of a liquid medium delivery device 1 is illustrated in FIG. 1A to FIG. 2D. The device 1 comprises a curved rigid outer pipe 10 within which is inserted a curved rigid inner pipe 30. The outer pipe 10 has a first curved portion 11 and the inner pipe 30 has a corresponding second curved portion 31, the curved portions 11, 31 having a common centerline arc C1, the common centerline arc C1 forming an arc of a circle having a center point at P1 with a radius R1 between the center point P1 and the arc C1. The second curved portion 31 of the inner pipe 30 has an outer diameter that is sufficiently smaller than an inner diameter of the first curved portion 11 of the outer pipe 10 that the second curved portion 31 can move arcuately within the first curved portion 11 without binding on an inner surface of the first curved portion 11. Further, the arc C1 preferably has an arc measure in a range that permits arcuate movement of the second curved portion 31 of the inner pipe 30 over the entire, or almost the entire, arc length of the first curved portion 11 of the outer pipe 10. The outer pipe 10 is illustrated as an S-curve pipe, although any desired contour is possible depending on the application, provided the outer pipe 10 has the first curved portion 11.

Figure 1A:
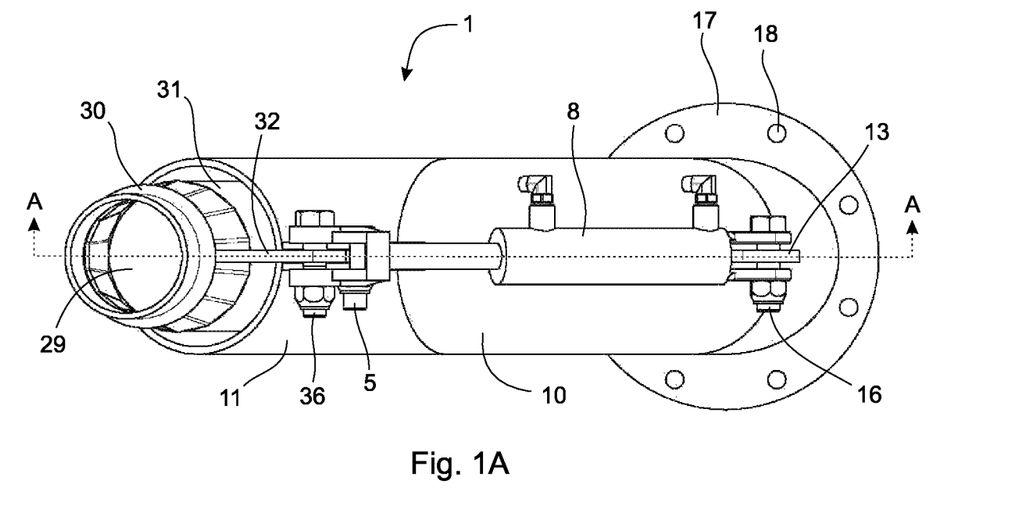
FIG. 1A is a top view of a first embodiment of a liquid medium delivery device with a hydraulic cylinder in an extended configuration.
Figure 1B:
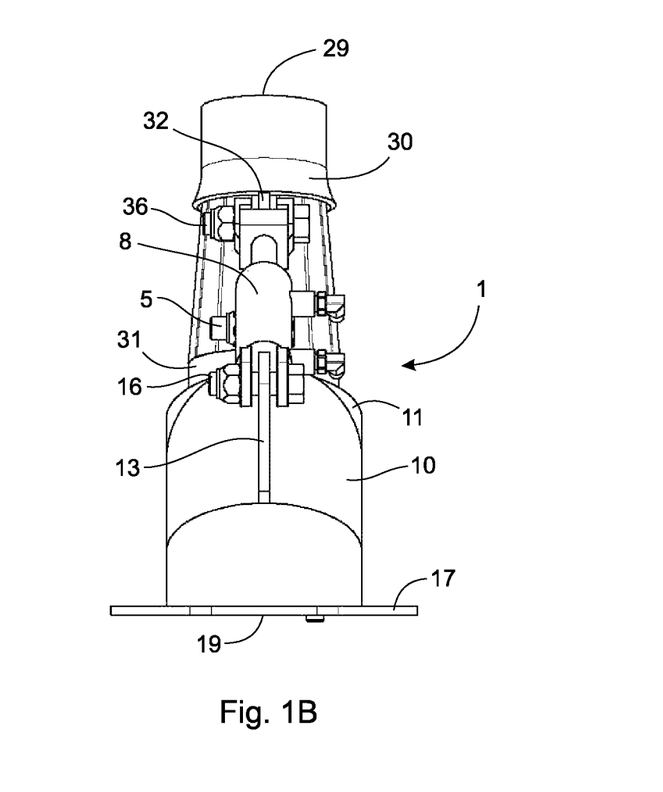
FIG. 1B is a front view of the device of FIG. 1A.
Figure 1C:
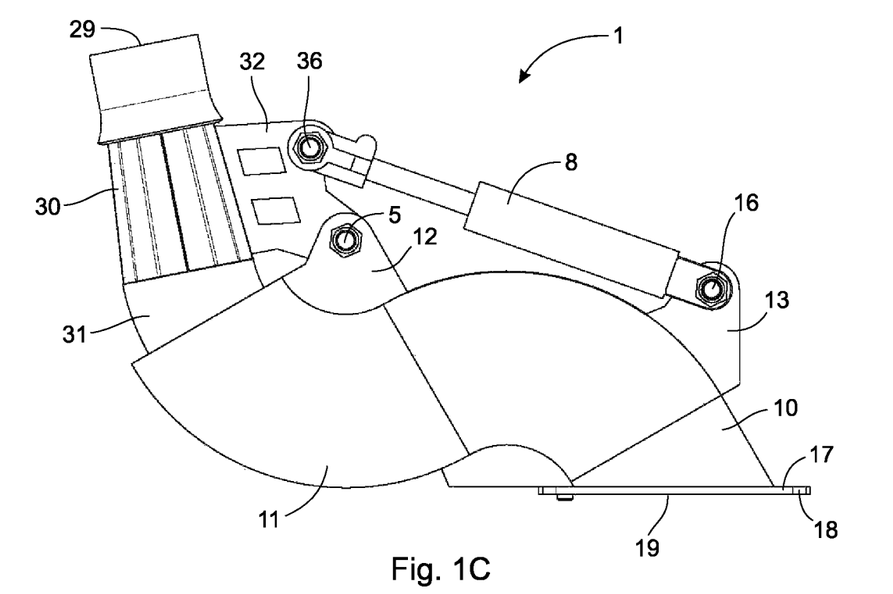
FIG. 1C is a side view of the device of FIG. 1A.
Figure 1D:
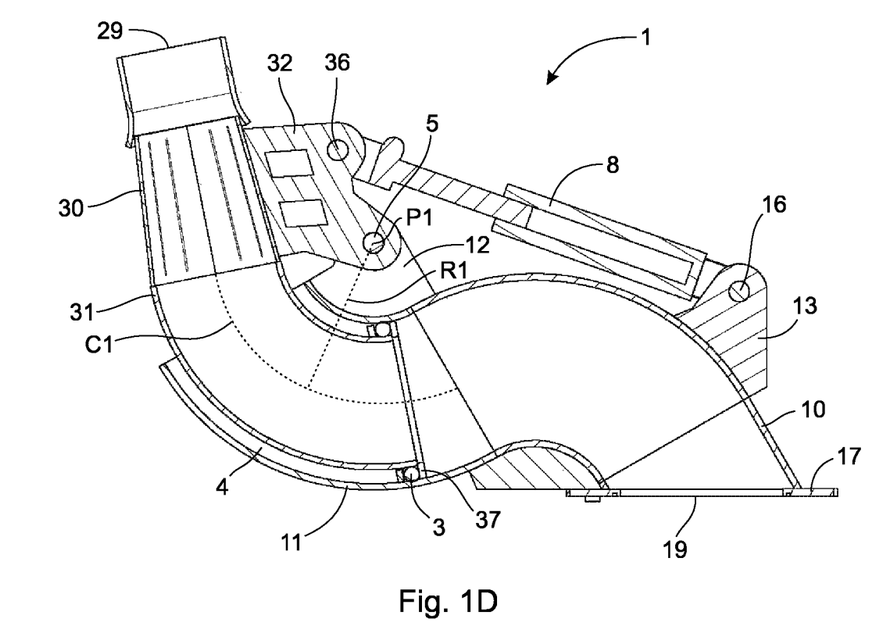
FIG. 1D is a side cross-sectional view through A-A of the device of FIG. 1A.

The outer pipe 10 comprises a distal mounting bracket 12 and a proximal mounting plate 13, both rigidly attached to the outer pipe 10 on an outer surface of the outer pipe 10.

The inner pipe 30 comprises a dual-purpose mounting plate 32 (although two separate mounting structures could be used, if desired) rigidly mounted to an outer surface of the inner pipe 30. The inner pipe 30 is pivotally connected to the outer pipe 10 by a pivot pin 5 inserted through apertures in the dual-purpose mounting plate 32 and the distal mounting bracket 12, respectively. The pivot pin 5 coincides with the center point P1 of the common centerline arc C1. The inner pipe 10 is able to pivot about pivot pin 5, and therefore pivots about the center point P1 when the second curved portion 31 of the inner pipe 30 moves arcuately within the first curved portion 11 of the outer pipe 10. Thus, the inner pipe 30 pivots about a pivot point that is external to both the outer pipe 10 and the inner pipe 30.

The device 1 further comprises a hydraulic cylinder 8 pivotally connected to both the outer pipe 10 and the inner pipe 30. The hydraulic cylinder 8 is pivotally connected to the outer pipe 10 by a pivot pin 16 inserted through an aperture in the proximal mounting plate 13. The hydraulic cylinder 8 is pivotally connected to the inner pipe 30 by a pivot pin 36 inserted through an aperture in the dual-purpose mounting plate 32. The pivot pin 36 is spatially offset from the pivot pin 5, which permits actuation of the hydraulic cylinder 8 to arcuately move the second curved portion 31 within the first curved portion 11. The pivot pin 16 on the proximal mounting plate 13 of the outer pipe 10 is in a location opposed to the pivot pin 36 on the dual-purpose mounting plate 32 of the inner pipe 30 across the inner curvatures of the first and second curved portions 11, 31, respectively. A line between the pivot pin 16 and the pivot pin 36 (i.e., a longitudinal axis of the hydraulic cylinder 8) is coplanar with, or almost coplanar with, the pivot point and the pivot pin 5.

In operation, extension and retraction of the hydraulic cylinder 8 causes the inner pipe 30 to pivot at the pivot pin 5, which causes the second curved portion 31 of the inner pipe 30 to move arcuately within the first curved portion 11 of the outer pipe 10. As can be seen by comparing FIG. 1C to FIG. 2C, such arcuate movement changes the angular orientation of the outlet 29. The amount of change in the angular orientation of the outlet 29 depends on the length of the curved portions 11, 31, but is generally in a range of about 10° to about 85°. In some embodiments, the angular orientation of the outlet 29 can change between pointing 45° downward to 40° upward.

Figure 2A:
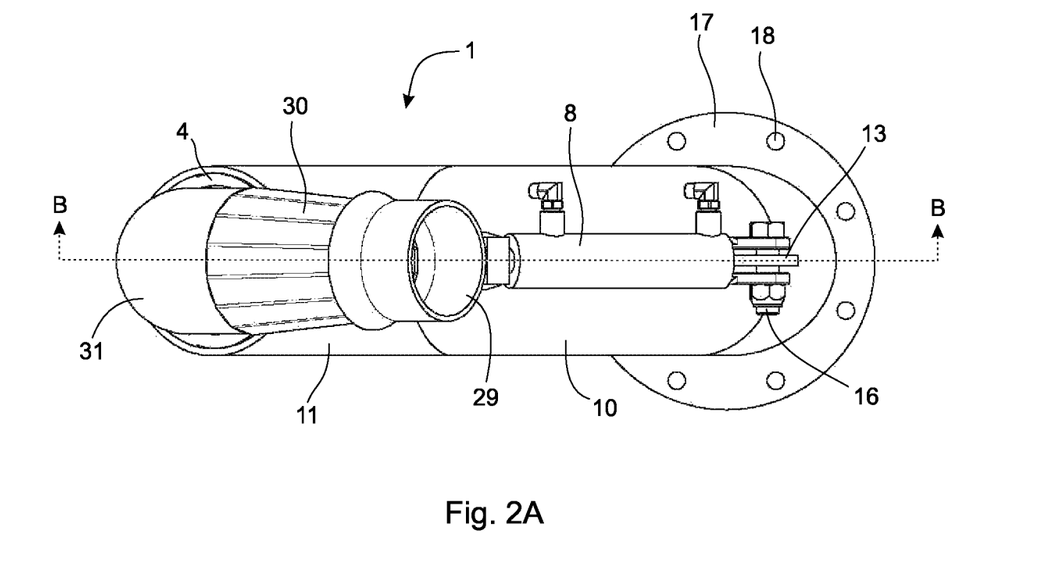
FIG. 2A is a top view of the device of FIG. 1A with the hydraulic cylinder in a retracted configuration.
Figure 2B:
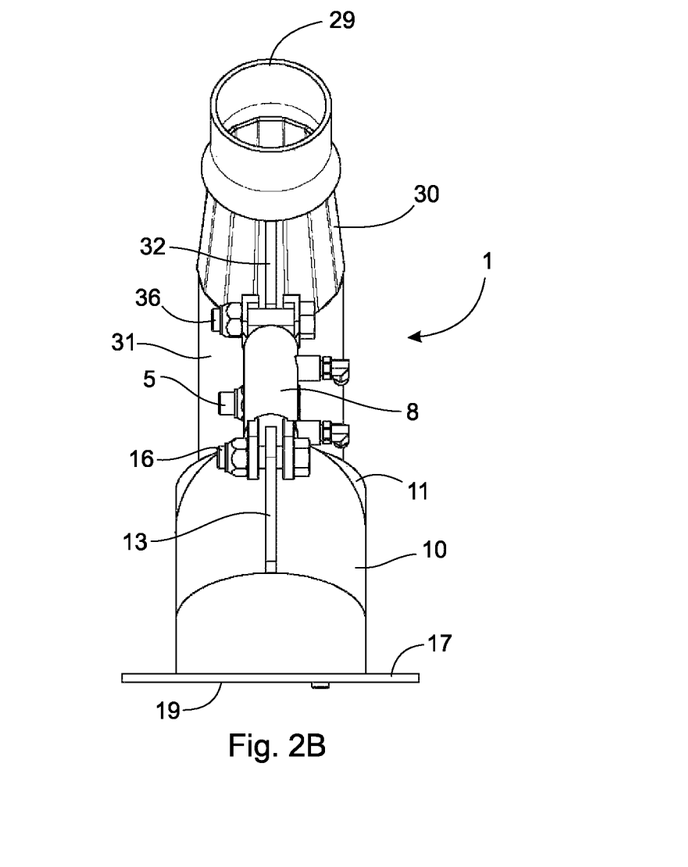
FIG. 2B is a front view of the device of FIG. 2A.
Figure 2C:
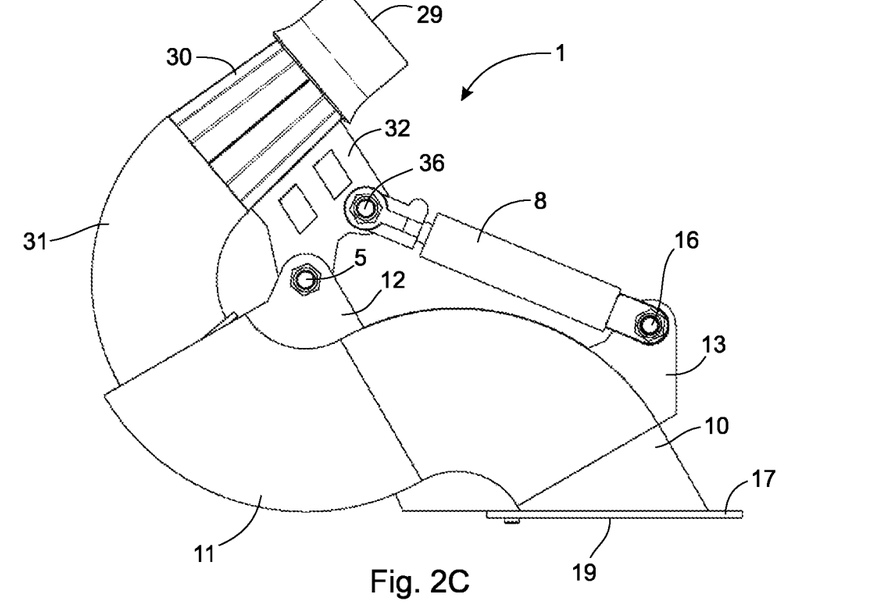
FIG. 2C is a side view of the device of FIG. 2A.
Figure 2D:
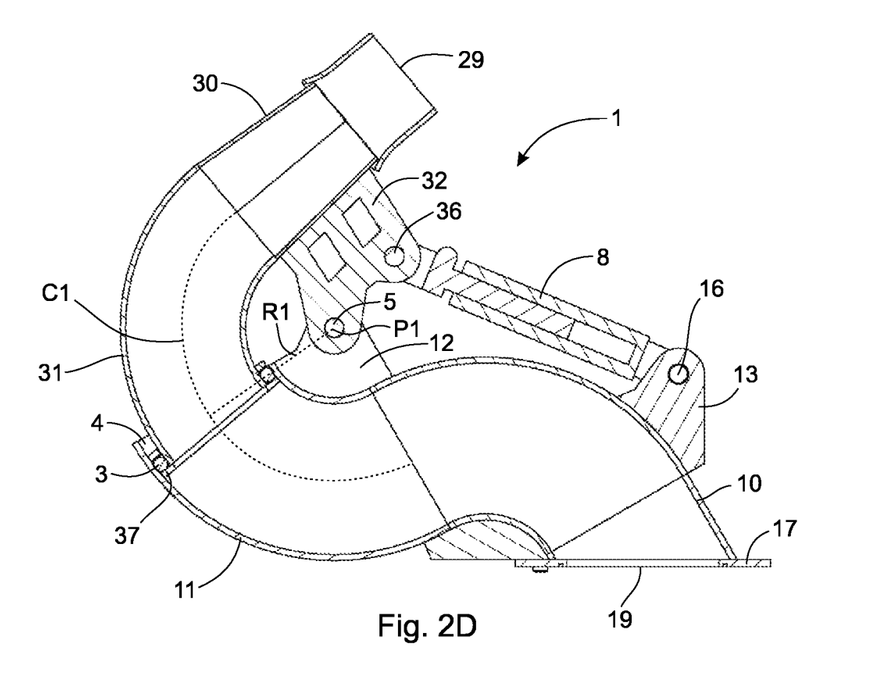
FIG. 2D is a side cross-sectional view through B-B of the device of FIG. 2A.
Figure 3A:
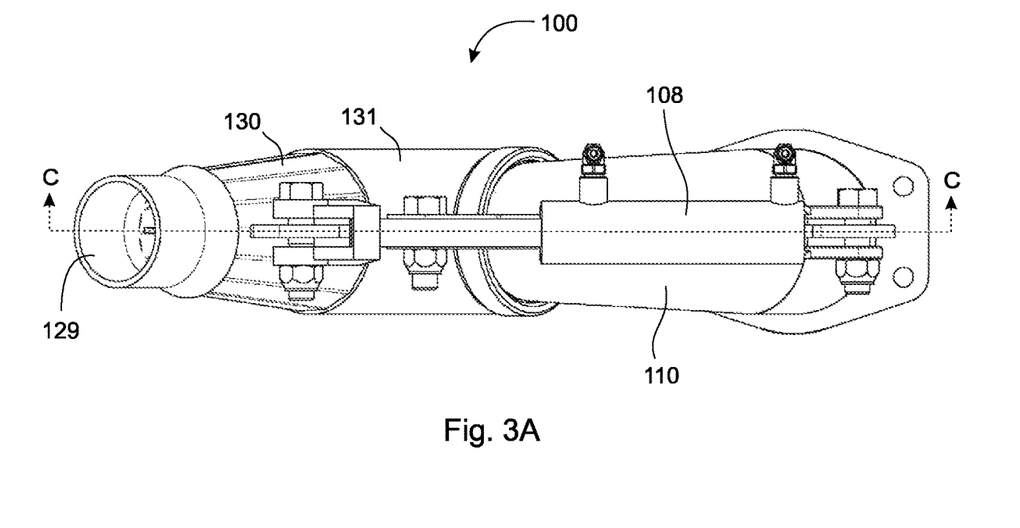
FIG. 3A is a top view of a second embodiment of a liquid medium delivery device with a hydraulic cylinder in an extended configuration.
Figure 3B:
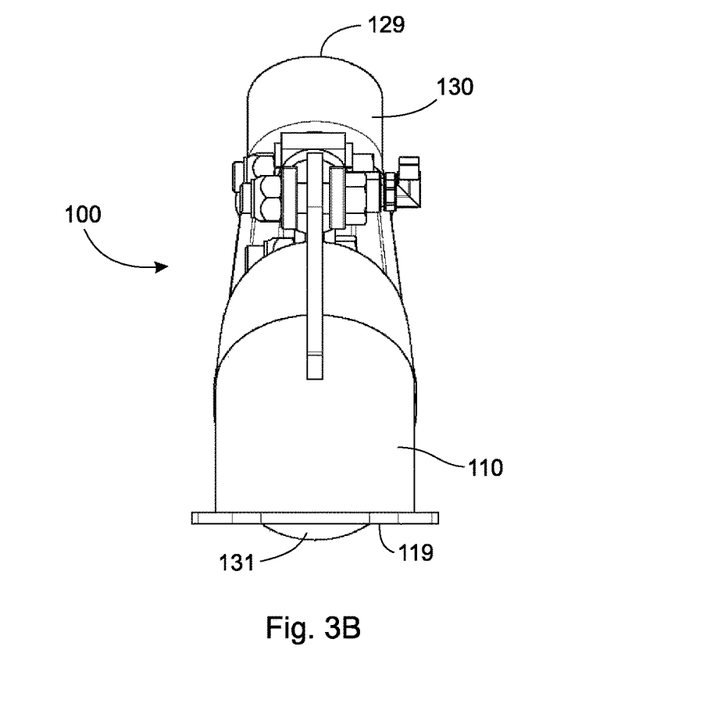
FIG. 3B is a front view of the device of FIG. 2A.
Figure 3C:
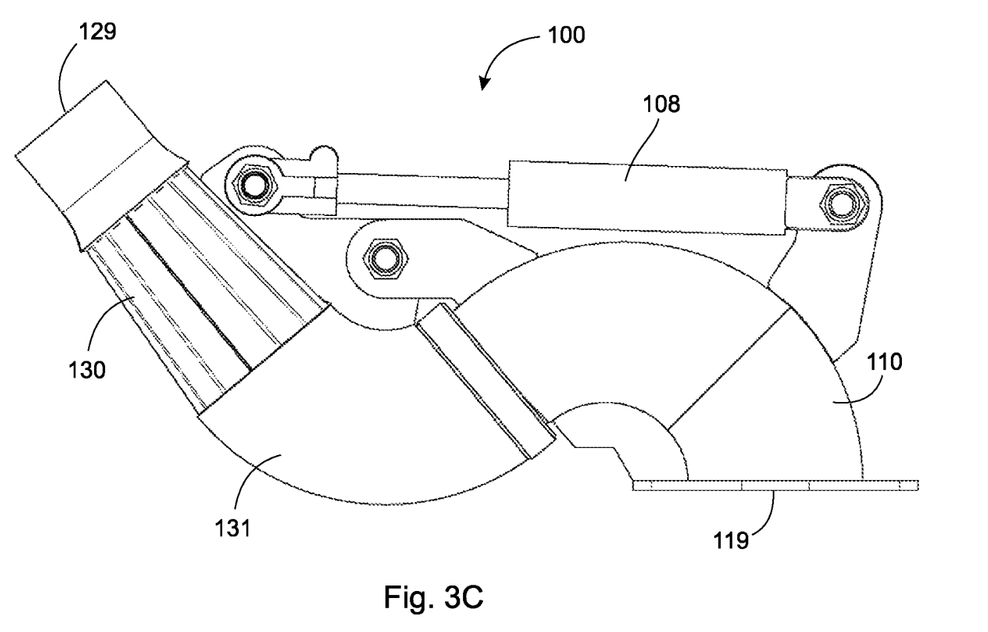
FIG. 3C is a side view of the device of FIG. 2A.
Figure 3D:
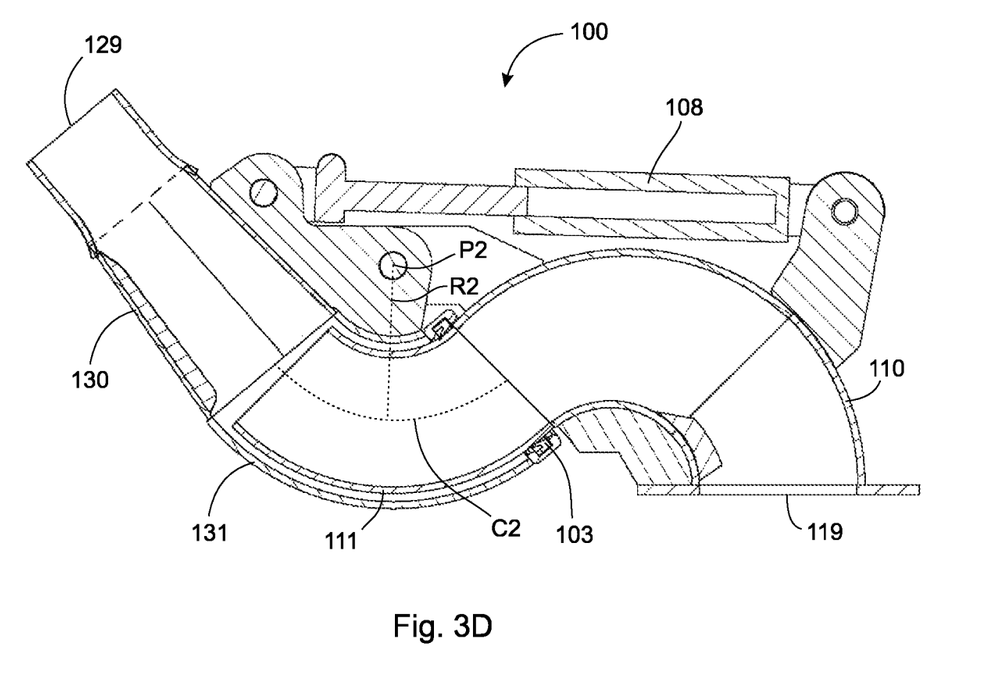
FIG. 3D is a side cross-sectional view through C-C of the device of FIG. 3A.
Figure 4A:
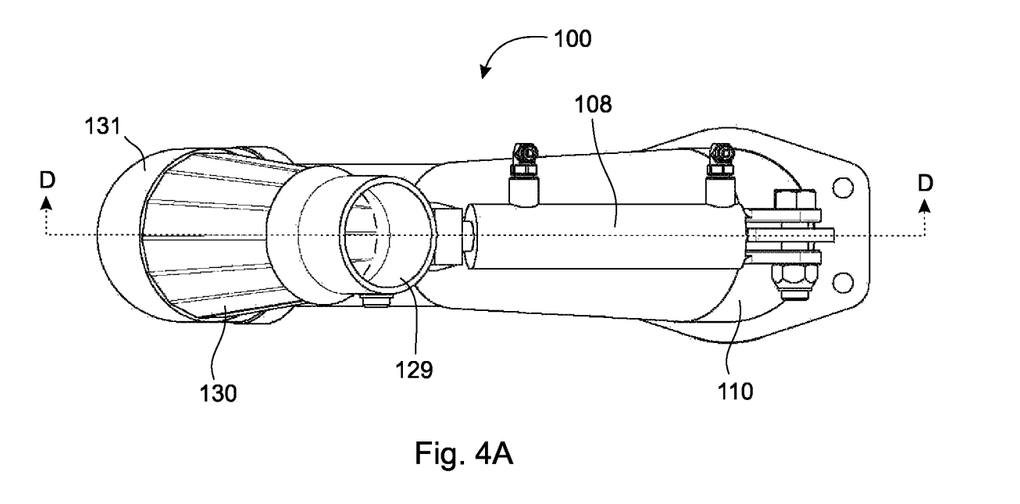
FIG. 4A is a top view of the device of FIG. 3A with the hydraulic cylinder in a retracted configuration.
Figure 4B:
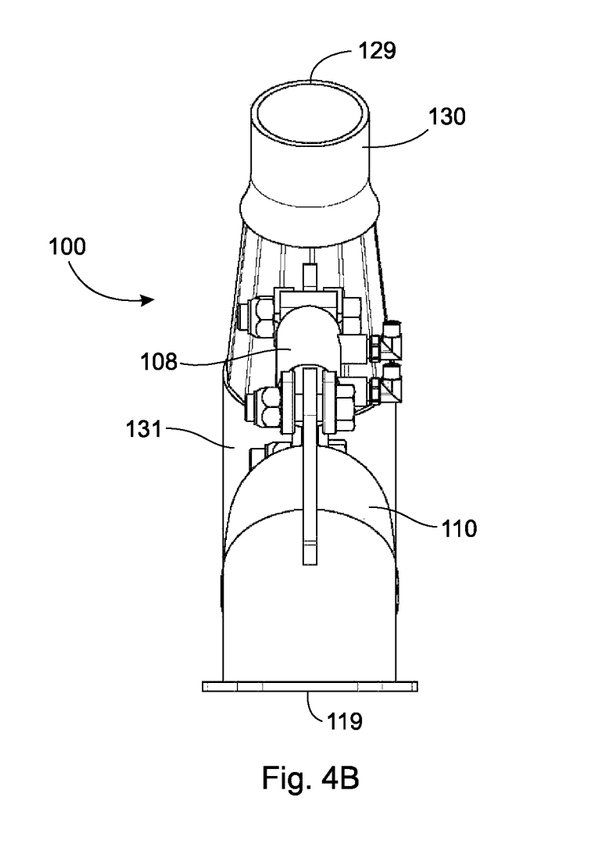
FIG. 4B is a front view of the device of FIG. 4A.
Figure 4C:
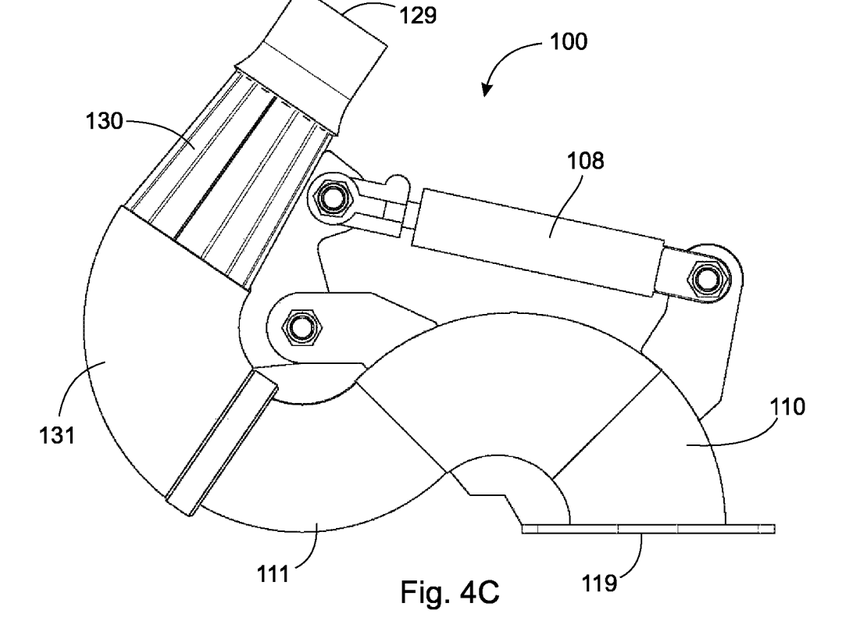
FIG. 4C is a side view of the device of FIG. 4A.
Figure 4D:
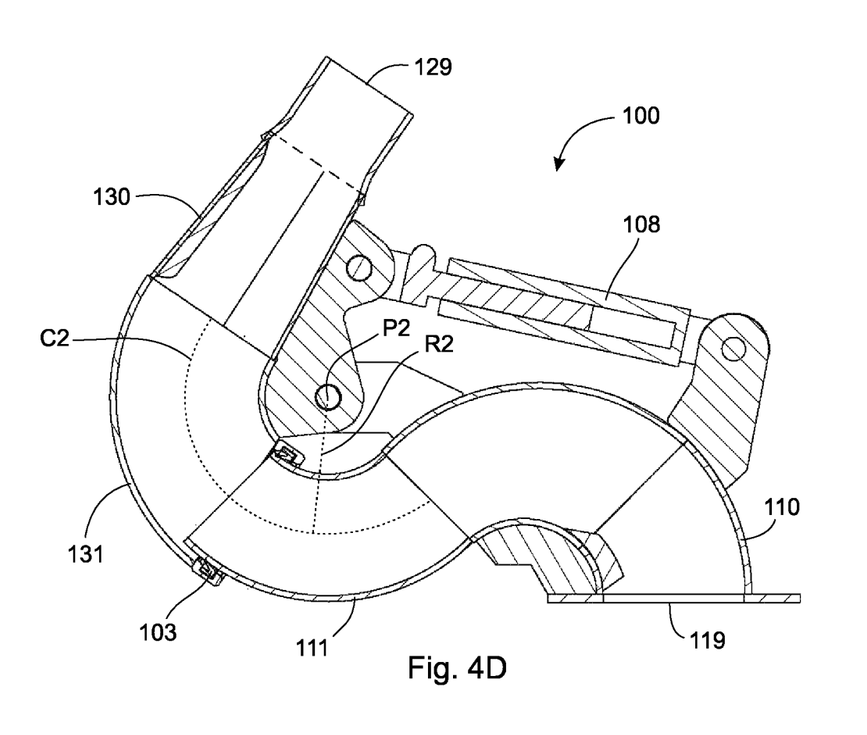
FIG. 4D is a side cross-sectional view through D-D of the device of FIG. 4A.
Figure 4E:
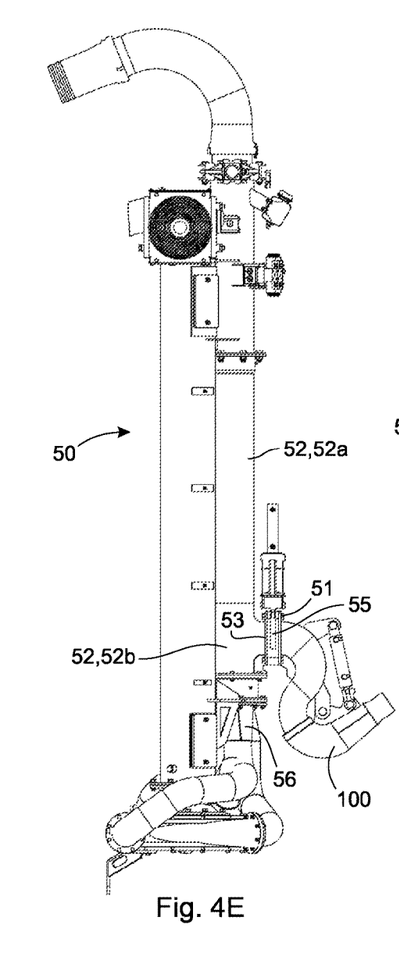
FIG. 4E is a side view of a liquid manure pump having the device of FIG. 4A mounted thereon for use as an agitator for liquid manure.
Figure 4F:
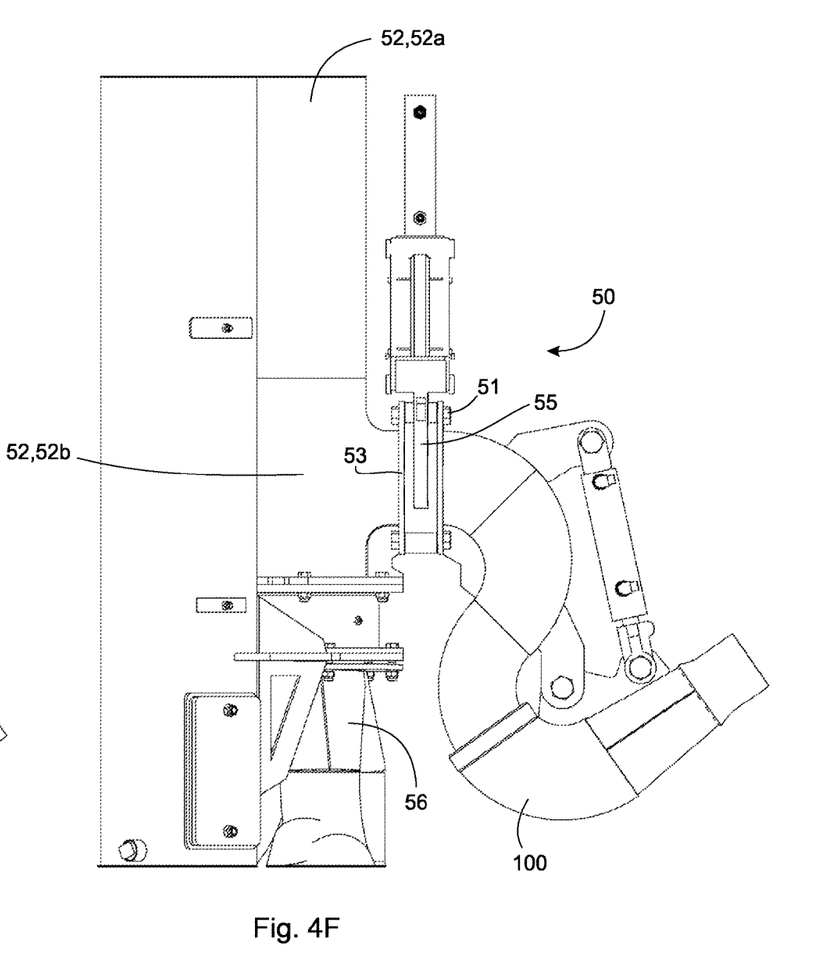
FIG. 4F is a magnified view of the liquid manure pump of FIG. 4E in a region around the device.
Figure 4G:
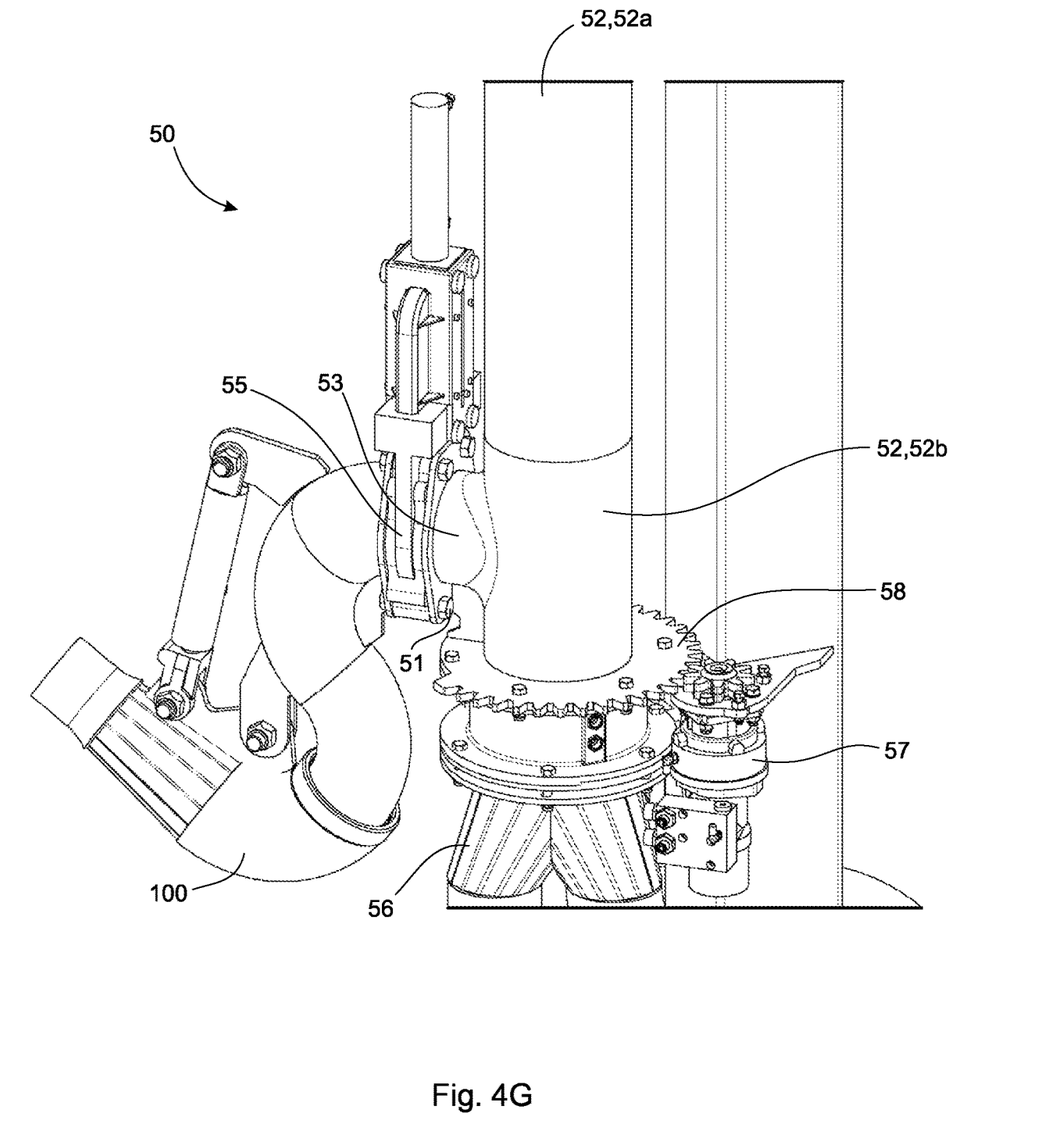
FIG. 4G is a magnified perspective view of the liquid manure pump of FIG. 4E in a region around the device from an opposite side of the liquid manure pump from FIG. 4F.

A gap 4 between the inner surface of the first curved portion 11 of the outer pipe 10 and the outer surface of the second curved portion 31 of the inner pipe 30 is sealed by an elastomeric O-ring 3 mounted on the second curved portion 31 at a proximal end of the second curved portion 31. A retaining bracket 37 at the proximal end of the second curved portion 31 retains the O-ring 3 on the second curved portion 31. The O-ring 3 moves with the inner pipe 30 as the inner pipe 30 is pivoted by the hydraulic cylinder 8.

Figure 1E:
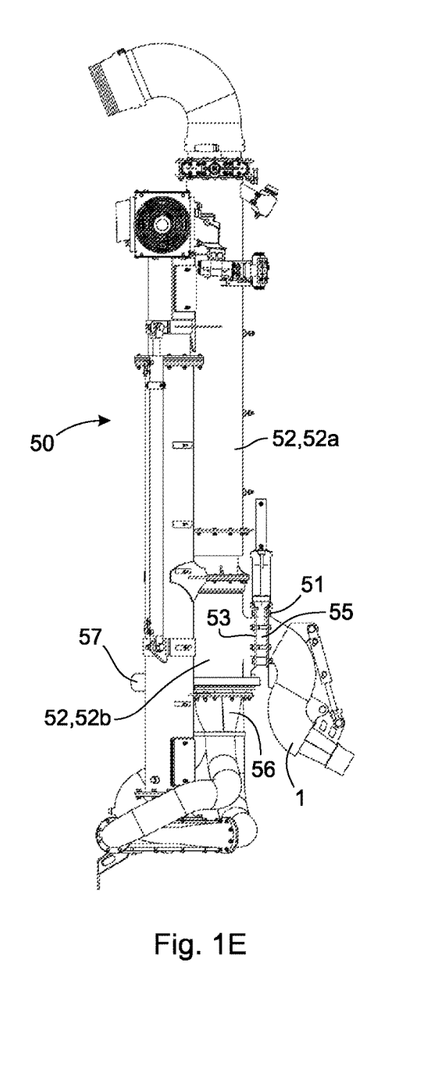
FIG. 1E is a side view of a liquid manure pump having the device of FIG. 1A mounted thereon for use as an agitator for liquid manure.
Figure 1F:
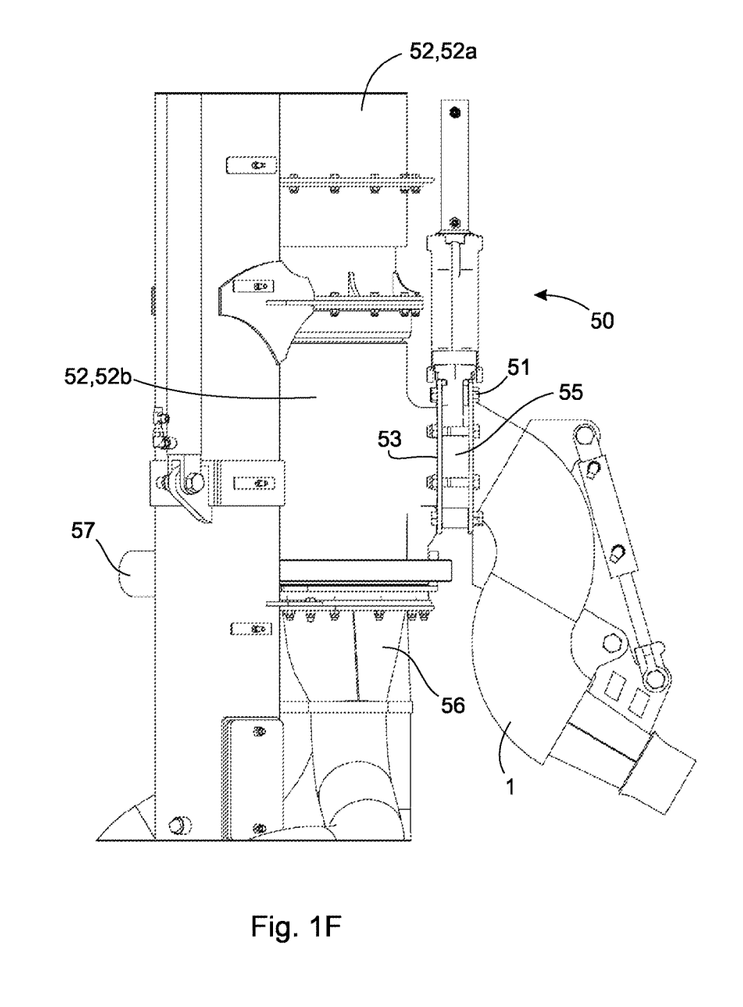
FIG. 1F is a magnified view of the liquid manure pump of FIG. 1E in a region around the device.
Figure 1G:
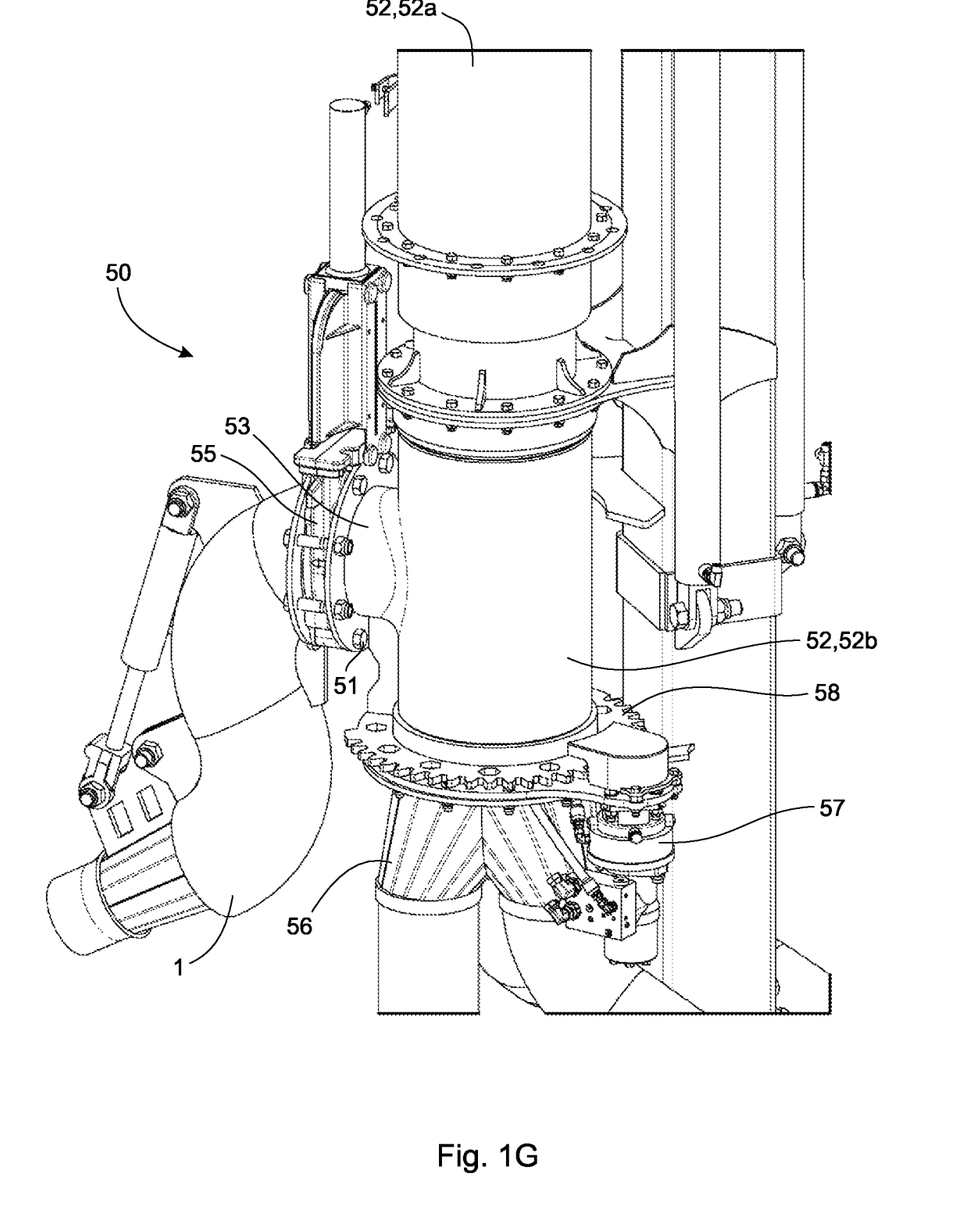
FIG. 1G is a magnified perspective view of the liquid manure pump of FIG. 1E in a region around the device from an opposite side of the liquid manure pump from FIG. 1F.

A circumferential mounting flange 17 located at a proximal end of the outer pipe 10 has a plurality of bolt holes 18 (only one labeled) to permit mounting the device 1 on a port 53 connected to a liquid medium line 52 of a pump 50 using bolts 51 (only one labeled), as seen in FIG. 1E, FIG. 1F and FIG. 1G. A valve 55 is provided to control a flow of the liquid medium from the liquid medium line 52 through the device 1. The liquid medium line 52 comprises a rotary coupler 52b connecting the liquid medium line 52 to a lower portion 56 of the pump 50. The port 53 is located on the coupler 52b, therefore the device 1 is connected to the coupler 52b. The coupler 52b is able to rotate about a longitudinal axis passing through a center of the liquid medium line 52 through action of a drive 57 (e.g., a slew drive or similar structure) operatively connected to a gear 58 fixedly mounted to the coupler 52b. Rotation of the coupler 52b using the drive 57 causes the device 1 to rotate around the longitudinal axis of the liquid medium line 52 thereby rotating the device 1 around the outside of the liquid medium line 52. An upper portion 52a of the liquid medium line 52 is in fluid communication with the coupler 52b but does not rotate with the coupler 52b. The pump 50 is preferably a liquid manure pump, for example the pump described in U.S. Pat. No. 8,944,758 issued Feb. 3, 2015, the entire contents of which is herein incorporated by reference. Liquid medium from the pump 50 enters the device 1 through an inlet 19 at a proximal end of the outer pipe 10 that is connected to the port 53 via the valve 55. The liquid medium exits the device 1 through an outlet 29 at a distal end of the inner pipe 30. The outlet 29 is located on a nozzle portion of the inner pipe 30 that has a smaller diameter than that of the proximal end of the inner pipe 30.

A second embodiment of a liquid medium delivery device 100 is illustrated in FIG. 3A to FIG. 4G. The device 100 differs from the device 1 primarily in that a second curved portion 131 of an outer pipe 130 moves arcuately as a result of extension and retraction of hydraulic cylinder 108, with a first curved portion 111 of an inner pipe 110 remaining stationary and mounted to the pump 50. In contrast, in the device 1, the outer pipe 10 is stationary and mounted to the pump 50, with the inner pipe 30 moving arcuately as a result of extension and retraction of hydraulic cylinder 8. Further, in the device 100, the outer pipe 130 comprises an outlet 129 and an inner pipe 110 comprises an inlet 119. In contrast, in the device 1, the inner pipe 30 comprises the outlet 29 and the outer pipe 10 comprises the inlet 19. Further, in the device 100, a lip seal 103 is mounted on an inner surface of the second curved portion 131 of the outer pipe 130 at a proximal end of the outer pipe 130, the lip seal 103 moving with the outer pipe 130 as the outer pipe 130 is moved by the hydraulic cylinder 108. In the device 1, the O-ring 3 is mounted on the outer surface of the inner pipe 30 at the proximal end thereof. Further, the use of a lip seal 103 (e.g., a ring lock style fluid coupling seal) provides some flexibility, allowing for some misalignment between the inner and outer pipes. When the lip seal 103 is under pressure the resilient material of the lip seal 103 can better conform to the shape of the first curved portion 111. On the other hand, with the device 1 there is no common seal inverse with a ring lock style fluid coupling seal so the O-ring 3 is used instead. The gap 4 between the inner and outer pipes is larger than in the device 100 so the O-ring 3 is thicker to compensate for any misalignment of the inner and outer pipes. Otherwise, operation and construction of the device 100 is the same as the device 1. Similar to the device 1, in the device 100, the first curved portion 111 of the inner pipe 110 and the second curved portion 131 of the outer pipe 130 have a common centerline arc C2, the common centerline arc C2 forming an arc of a circle having a center point at P2 with a radius R2 between the center point P2 and the arc C2. Operation of the device 100 is the same as operation of the device 1 except that the second curved portion 131 of the outer pipe 130 moves arcuately on the first curved portion 111 of the inner pipe 110. Further, the pump 50 (see FIG. 4E, FIG. 4F and FIG. 4G) operates in the same manner as described in connection with FIG. 1E, FIG. 1F and FIG. 1G except that the coupler 52b is fixedly attached to the upper portion 52a of the liquid medium line 52 so that operation of the drive 57 causes both the coupler 52b and the upper portion 52a of the liquid medium line 52 to rotate about the longitudinal axis of the liquid medium line 52. Such an arrangement permits mounting a plurality of liquid medium delivery devices along a length of the liquid medium line while permitting rotation of all of the of liquid medium delivery devices using a single drive.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A liquid medium delivery device useable in conjunction with a pump, the device comprising:
    a first rigid pipe and a second rigid pipe configured to receive flowing liquid medium from the pump;
    the first rigid pipe having a first curved portion;
    the second rigid pipe having a second curved portion whereby the second curved portion is at least partially disposed within the first curved portion of the first rigid pipe or the first curved portion is at least partially disposed within the second curved portion of the second rigid pipe; and,
    an actuator connected to the first rigid pipe or the second rigid pipe or both the first and second rigid pipes, the actuator moving either the first rigid pipe or the second rigid pipe so that either the first curved portion or the second curved portion moves along a common arc of both the first curved portion and the second curved portion
    wherein curvatures of the first rigid pipe and the second rigid pipe do not change as the actuator moves either the first rigid pipe or the second rigid pipe.

2. The device of claim 1, wherein the first rigid pipe or the second rigid pipe pivots about a pivot point external to both the first rigid pipe and the second rigid pipe so that the first rigid pipe or the second rigid pipe moves along the common arc.

3. The device of claim 2, wherein the pivot point is at a center of a circle defined by the common arc.

4. The device of claim 3, wherein the common arc defines a centerline arc of both the first curved portion and the second curved portion, and a distance from the pivot point to the centerline arc is a radius of both the first curved portion and the second curved portion.

5. The device of claim 2, wherein the actuator is pivotally connected to the first rigid pipe or the second rigid pipe at a connection point spatially offset from the pivot point.

6. The device of claim 1, wherein the actuator is pivotally connected to both the first rigid pipe and the second rigid pipe.

7. The device of claim 6, wherein: the actuator is pivotally connected to the first rigid pipe at a first location on the first rigid pipe; the actuator is pivotally connected to the second rigid pipe at a second location on the second rigid pipe; and, the first and second locations are in opposite sides of the pivot point from each other.

8. The device of claim 2, further comprising:
    a first mounting bracket attached to the first rigid pipe;
    a second mounting bracket attached to the second rigid pipe; and,
    a third mounting bracket attached to either the first or second rigid pipe and located between the first and second mounting brackets,
wherein:
    the actuator is pivotally connected to both the first and second mounting brackets; and,
    the third mounting bracket is pivotally connected to either the first or second mounting bracket at the pivot point.

9. The device of claim 1, further comprising a seal between the first and second curved portions of the first and second rigid pipes, respectively.

10. The device of claim 9, wherein the seal comprises at least one O-ring mounted:
    on the second curved portion of the second rigid pipe where the second curved portion is at least partially disposed within the first curved portion of the first rigid pipe; or,
    on the first curved portion of the first rigid pipe where the first curved portion is at least partially disposed within the second curved portion of the second rigid pipe.

11. The device of claim 1, wherein the actuator comprises a hydraulic cylinder.

12. A liquid medium delivery system comprising:
    a pump; and,
    a liquid medium delivery device as defined in claim 1, the first and second rigid pipes in liquid medium communication with the pump.

13. The system of claim 12, wherein the system further comprises,
    a liquid medium line through which the liquid medium is flowable,
    a port connected to the liquid medium line in liquid medium communication with the liquid medium line,
    a valve connected to the port by which a flow of the liquid medium through the port is controllable, the liquid medium delivery device connected to the port via the valve,
    a rotary connector connected to the liquid medium line and configured to rotate about an axis passing through the liquid medium line, the rotary connector rotatable to rotate the port, the valve, and the device about the axis.

14. The system of claim 12, wherein the pump is a liquid manure pump and the liquid medium delivery device is an agitator for liquid manure.

* * * * *